United States Patent [19]
Sampey

[11] 3,809,864
[45] May 7, 1974

[54] DISTANCE EVENT MARKER
[75] Inventor: Harry R. Sampey, Vanderbilt, Pa.
[73] Assignee: Pentron Industries, Inc., Vanderbilt, Pa.
[22] Filed: July 10, 1972
[21] Appl. No.: 270,300

Related U.S. Application Data
[63] Continuation-in-part of Ser. No. 194,401, Nov. 11, 1971, and a continuation-in-part of Ser. No. 245,432, April 19, 1972.

[52] U.S. Cl....... 235/92 DN, 235/92 TC, 235/92 R, 235/92 PE
[51] Int. Cl............................................. G06m 3/02
[58] Field of Search....... 235/92 PE, 92 LG, 92 EA, 235/92 CT, 92 DN, 92 TC; 328/48

[56] References Cited
UNITED STATES PATENTS
3,625,226  12/1971  Flesselles ......................... 235/92 PE
3,636,549  1/1972   Berman et al. ................... 235/92 EA
3,050,685  8/1962   Stuart............................... 235/92 PE
3,619,578  11/1971  George............................. 235/92 DN
3,708,750  1/1973   Buchs............................... 235/92 TF Primary Examiner—Paul J. Henon
Assistant Examiner—Joseph M. Thesz, Jr.
Attorney, Agent, or Firm—Cushman, Darby & Cushman

[57] ABSTRACT

The recording apparatus shown herein periodically records events as a function of distance traversed from a selected starting point. The system generates a plurality of input pulses, each one of which indicates the traverse of a selected unit distance, while a programmable counter periodically produces an output upon the occurrence of a selected programmable number of pulses thereby indicating a desired interval of traversed distance. A recording device such as a paint sprayer responds to the output of the programmable counter for recording the occurrence of the output at the desired interval of traversed distance.

20 Claims, 3 Drawing Figures

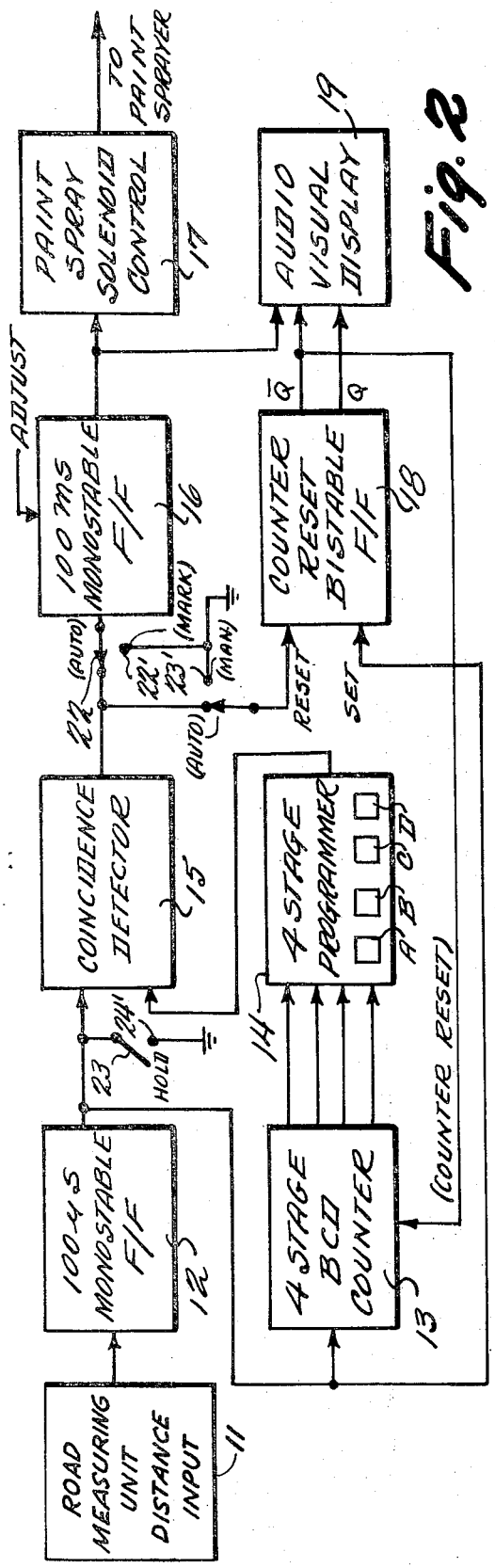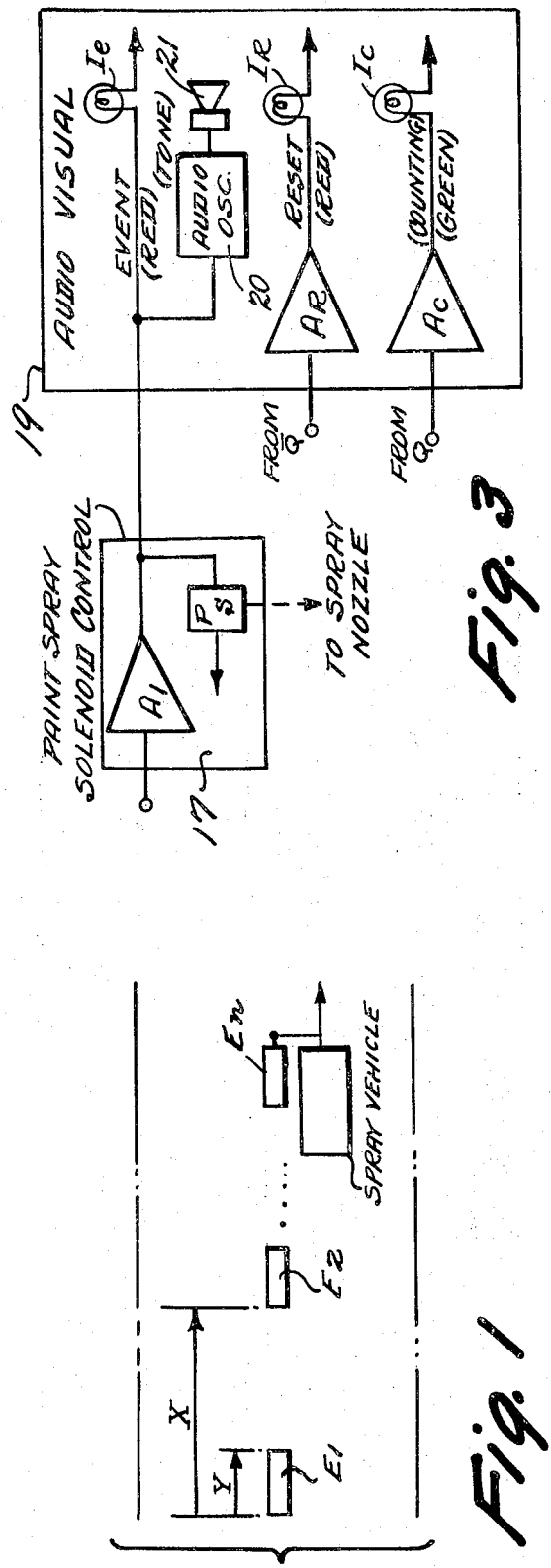

DISTANCE EVENT MARKER

REFERENCE TO RELATED APPLICATIONS

This application is a continuation-in-part of my prior co-pending application for a Programmable Distance Measuring Instrument, U.S. Ser. No. 194,401 filed Nov. 11, 1971, and also a continuation-in-part of my co-pending application for a Vehicle Separation Measuring System, U.S. Ser. No. 245,432 filed Apr. 19, 1972.

BACKGROUND OF THE INVENTION

The apparatus as described herein relates generally to distance measuring instruments and in particular to a system for periodically recording events as a function of distance traversed from any selected starting point.

As was mentioned in my co-pending application, noted above, the requirement for an accurate measuring system becomes extremely important for certain applications, especially those relating to highway marking. In the first of those applications, namely the Programmable Distance Measuring Instrument, Ser. No. 194,401, a system was described for measuring distances traversed by a vehicle over a road surface in any of a plurality of measuring systems utilizing a programmable counter, which provided an output indicative of traversed distance. Counts generated by the programmable counter were derived from a high frequency oscillator gated in accordance with the wheel pulses. This system has proved to be a satisfactory method of producing an output indicative of traversed distance with great accuracy. Furthermore, the other co-pending application for a Vehicle Separation Measuring System, Ser. No. 245,432 filed Apr. 19, 1972, utilizes the programmable counter disclosed in the distance measuring system to generate inputs to an up/down counter, which is utilized to provide an indication which is useful in assisting the driver of a following vehicle to maintain an accurate, uniform distance from a lead vehicle. One of the applications for such a device, as mentioned in that application, would be to assist in marking highways for passing and no-passing zones.

The apparatus as disclosed herein utilizes the programmable counter of the Programmable Distance Measuring Instrument for generating input pulses indicative of a selected unit of traversed distance. After a selected distance has been traversed as sensed by the apparatus described herein, an output signal of selected duration is produced which controls a recording device which marks the beginning of an event for a selected period of time.

One application of the previously described distance event marker would be to provide uniform markings of a highway passing zone as a function of the distance travelled by a marking vehicle.

The distance travelled by the vehicle is indicated by the Programmable Distance Measuring Instrument and it provides output pulses of a selected unit distance, (e.g., one foot). A controller accumulates the distance until a preset desired interval of traversed distance is reached, at which time a signal is produced by the controller to a paint marker which controlling a solenoid, operates a paint sprayer to mark the road. After a selected spray interval has occurred, a cut off of the sprayer is accomplished, and reset of the controller is effected for measuring the next interval of desired traversed distance. This process repeats itself until the controller is held off, by the operator of the system, whereby a series of marks are deposited on the road surface, which marks designate a zone having uniform length and separation between each marker.

There are, of course, other applications of the apparatus described herein, as will be apparent to those skilled in the art. However, it is intended that the description herein is exemplary of other applications wherein the apparatus of the present invention may be utilized.

It should be noted that prior art devices of the type described herein are hampered by the fact that the distance between the events to be marked and the duration of the mark interval suffer from irregularities occasioned by inaccurate measuring apparatus, and the heavy reliance upon human intervention to perhaps initiate each of the event marking cycles.

It is therefore an object of the present invention to provide an arrangement which substantially obviates one or more of the limitations and disadvantages of the described prior arrangement.

It is another object of the present invention to provide an improved, simplified, and inexpensive arrangement for marking the events as a fucntion of distance traversed from a selected starting point.

It is yet another object of the present invention to provide an accurate system for recording the occurrence of events.

SUMMARY OF THE INVENTION

There has been provided a system for periodically recording events as a function of distance traversed from a selected starting point. The system includes input means which generates a plurality of input pulses, each of which indicates the traverse of a selected unit distance, while a programmable means periodically produces an output upon the occurrence of a selected programmable number of the pulses, thereby being indicative of a desired interval of traversed distance. Means is provided which responds to the output of programmable means and records the occurrence of that output.

For a better understanding of the present invention, together with other and further objects thereof, reference is directed to the following description taken in connection with the accompanying drawings, while its scope will be pointed out in the appended claims.

BRIEF DESCRIPTION OF THE DRAWINGS

FIG. 1 is a plan view illustrating one of the useful applications of the present invention.

FIG. 2 is a block diagram generally showing the components of the present invention.

FIG. 3 is a detail of a portion of the apparatus shown in FIG. 2.

DESCRIPTION OF THE PREFERRED EMBODIMENT

FIG. 1 shows one exemplary application of the apparatus of the present invention, wherein a spray vehicle 10, travelling as indicated at 15 mph, traverses the highway and deposits event marks $E_1, E_2 \ldots E_n$ on the roadway as shown in the figure. The distance Y shown therein is the length of a mark deposited on the roadway, while the distance X is the distance from the beginning of the first event mark $E_1$ to the beginning of the next succeeding event mark $E_2$. In the present apparatus, the distances X between each succeeding event mark and the previous mark are substantially unform as well as their lengths Y.

The system devised herein, is adapted to measure the distance X for each succeeding event and also to deposit the marks $E_1$ through $E_n$ in equal lengths Y as shown. However, it is also possible to manually actuate the marker system so that at selected times when the operator deems proper, he may actuate the system for marking the highway, thus recording some significant event, for example, the beginning or ending of a passing zone. Later on, the intermediate portions of the zone may be marked with the apparatus of the present invention.

In FIG. 2, there is illustrated the apparatus of the present invention, including a unit distance input 11 which is described in detail in my co-pending application for a Programmable Distance Measuring Instrument previously mentioned. Furthermore, there is shown a mono-stable flip-flop 12, coupled to a coincidence detector 15. The mon-stable flip-flop 12 drives a four stage binary coded decimal (BCD) counter 13, which has four outputs which are coupled to a four stage programmer 14 having setting switches A, B, C, D, the operation of which has been described in each of the previously mentioned co-pending applications. The output of the four stage programmer 14 is coupled to the input of the coicidence detector 15 along with the output of mono-stable flip-flop 12. The output of the coincidence detector 15 is coupled to both a monostable flip-flop 16 and a "reset" input of a counter reset bi-stable flip-flop 18. The mono-stable flip-flop 16 drives a paint spray solenoid control 17 for 100 milliseconds when activated for recording the events, namely the zones, as previously described. The monstable flip-flop 16 has an adjustment shown in FIG. 2 which can be used to vary the duration of the monostable output. Another output of the mono-stable flip-flop 16 is coupled to an audio visual 19 which provides indication that an event is being recorded. The counter reset bi-stable flip-flop 18 has another input coupled from the mono-stable flip-flop 12 which input "sets" the flip-flop. As previously noted, the other input of the counter reset bi-stable flip-flop 18 is derived from the coincidence detector 15 for resetting the flip-flop 18, each set and reset input causing the flip-flop to produce associated outputs Q and $\bar{Q}$ which are coupled to the audio visual display 19, indicating respectively a counting and reset mode. The reset output of the flip-flop 18 noted at $\bar{Q}$ is coupled to an input of the counter 13 for resetting, the purpose of which shall be described further in the description.

FIG. 3 shows details of the solenoid control 17 and the audio visual display 19 shown in FIG. 2. Amplifier $A_1$ receives the signal from the mono-stable flip-flop 16, amplifying same, and producing an output for energizing a paint spray relay PS, which is shown in FIG. 3, with an illustrative coupling to the sprayer nozzle (not shown). Furthermore, an output of the amplifer $A_1$ is coupled to an indicator $I_c$ (a red lamp) indicating the occurrence of an event being recorded. In addition, an audio oscillator 20 produces a tone at speaker 21 providing audio indication to the operator of the vehicle that an event is being marked. Outputs Q and $\bar{Q}$ of counter reset bi-stable flip-flop 18 are coupled to the respective inputs of amplifiers $A_c$ and $A_r$, indicating counting and reset modes. These amplifiers $A_c$ and $A_r$ respectively energize indicator lamps $I_c$ and $I_r$ when their inputs are energized by appropriate outputs of the bi-stable flip-flop 18. $I_c$ and $I_r$ respectively, indicate "counting" and "reset" modes.

Referring back to FIG. 2, a more detailed description of the apparatus herein follows. The unit distance input 11 previously mentioned, generates a pulse train of electric signals, each pulse indicative of some selected unit distance, perhaps for example the unit distance input produces a signal for each foot of travel for the vehicle. Each unit input distance signal is coupled to the monostable flip-flop 12 which in the present apparatus produces a 100 microsecond output, which output has a multiple function. Firstly, the output of monostable flip-flop 12 drives a four stage binary coded decimal counter, the operation of which is generally appreciated by those skilled in the art. This counter 13 accumulates counts for each output pulse of the flip-flop 12, which of course, as previousy mentioned, produces a 100 microsecond pulse for each unit distance input pulse 11. One important reason for utilizing the flip-flop 12, as those familiar with the art will realize, is to provide uniform input pulses for the counter 13. The unit distance input 11 may readily produce such an input, however, for purposes of explanation, this need not be assumed. The four-stage counter 13 is coupled to a four-stage programmer 14 which has included therein thumb wheel switches A, B, C and D, each of which respectively govern selected sets of inputs to AND gates (not shown) included therein. The AND gates when appropriately conditioned produce an output signal at the programmer 14 output when a certain number of counts are accumulated in the four-stage counter 13. Such a programmable means having been adapted, in each of the previously mentioned co-pending applications, once again finds application herein for enabling the use of a programmable number of counts to represent a selected distance which may be used to drive the recording device herein. The output of the programmer 14 is coupled to the coincidence detector 15, along with an output from the mono-stable flip-flop 12, whereby each unit distance input 11 is coupled to the input of the coincidence detector 15. However, when the selected programmed number of counts have been realized, the programmer 14 enables an output for energizing the coincidence detector 15 coincidentally with the next pulse produced by the monostable, as the vehicle traverses the desired interval of traversed distance. The output of the coincidence detector 15 thus produced, as a result of the two inputs from the programmer 14 and the flip-flop 12, provides an input for activating mono-stable flip-flop 16. As previously described, flip-flop 16 produces a 100 millisecond output which in the present embodiment is adjustable to other durations as desired.

The output of mono-stable flip-flop 16 drives the paint spray solenoid control 17 for a 100 millisecond interval as indicated in the drawings. It is contemplated that for a travelled speed of approximately 15 mph and a hundred millisecond duration, the paint spray solenoid control will open the nozzle of the sprayer (not shown) long enough to produce a 2 ½ foot line on the roadway. This, of course, is adjustable in accordane with the desired length of the line as shown in FIG. 1.

As previously noted, the output from the flip-flop 16 is coupled to the display 19 producing the audio tone, and the light indication during a mark interval.

The coincidence detector 15 while producing an input for driving the mono-stable flip-flop 16, also is coupled to the counter reset bi-stable flip-flop 18, which flip-flop has two inputs indicated in the drawing as "reset" and "set". The counter reset flip-flop 18 is normally driven to its "set" condition by an output of the mono-stable flip-flop 12. Each time a unit distance input 11 is produced, flip-flop 12 is gated for 100 microseconds. Accordingly, the bi-stable flip-flop 18, coupled to the output of flip-flop 12, is driven to a set condition whereby the flip-flop 18 produces an output in one of its stable states on line Q as indicated in the drawing. Such a flip-flop arrangment is well known in the art, and the output Q drives the display 19 to indicate a counting mode. However, when the coincidence detector 15 has been activated, the output thereof resets flip-flop 18. This is accomplished by coupling the coincidence detector output 15 to the "reset" input of the flip-flop 18, whereby an output is produced on the Q̄ line which is coupled to display 19 and a counter reset input of the four stage counter 13. This output pulse of the reset flip-flop 18 resets the counter 13 to zero, at which time the counter begins again to accumulate the selected number of counts necessary to produce another coincidence output and thereby produce another recording mark on the wayside as previously described.

A number of manual circuits have been incorporated into the system, including switch 22 having a grounded "mark" terminal 22'. Switch 22 may be manually actuated, so as to drive the monostable flip-flop 16 through a duty cycle for marking the road manually. During normal operation of the system, the switch 22 is coupled to the auto terminal, labeled as such in the drawing, permitting the system to operate as previously described. When manual marking is desired, switch 22 may be moved to "mark", terminal 22' to activate the monostable flip-flop 16 and hence the sprayer.

One of the other manual circuits has for its purpose to manually reset flip-flop 18 and counter 13, in order to clear the counter 13 so as to get an accurate measurement with respect to some arbitrarily selected starting point. To accomplish this, switch 23 is driven to the manual reset terminal 23' which grounds the reset input of bi-stable flip-flop 18 causing an output on Q̄ for resetting counter 13.

Another manual circuit is incorporated into the system in which the switch contact 23 couples a manual "hold" terminal 24' to the input of coincidence circuit 15 shown in FIG. 2, so as to hold off actuation of the circuit 15, whereby no output pulses are produced for driving the monostable flip-flop 16 and subsequently driving the paint spray solenoid control 17. This hold switch 23 may be utilized to hold off automatic marking and permit manual marking of the roadway as previously described at selected intervals, in conjunction with each actuation of manual switch 22. In fact, my Vehicle Separation Measuring System previously noted Ser. No. 245,432 co-pending herewith may be used in conjunction with this method of manual actuation, so that the beginnings and endings of zones may be marked as desired. The intermediate marks may be deposited at some later time.

It should be obious to those skilled in the art that there are numerous applications for an apparatus of the type described herein, which applications are fully intended to be covered by the appended claims. Furthermore, while there has been described what at present is considered to be the preferred embodiment of the present invention, it will be obvious to those skilled in the art that various changes and modifications may be made therein without departing from the invention and it is therefore aimed in the appended claims to cover all sorts of changes and modifications as fall within the true spirit and scope of the invention.

What is claimed is:

1. A system for use with a vehicle traveling over a road surface to periodically record events directly upon the road surface as a function of distance traversed by the vehicle from a selected starting point thereon comprising:

road measuring input means adapted for attachment to said vehicle for generating a plurality of input pulses, each pulse indicating the traverse of a selected unit distance along said road surface by the vehicle;

adjustable electronic program means connected to said input means for periodically counting the occurrences of input pulses and producing a program output signal upon the occurrence of any desired selected programmable number of said pulses corresponding to the current adjustment of electrical switch means included therein, said program output signal thereby being indicative of a desired interval of traversed distance along said road surface; and means responsive to the program output signal of said adjustable electronic program means for recording the then existing position of the vehicle along the road surface in response to the occurrence of said program output signal by applying a mark directly onto the surface of said road.

2. The system as described in claim 1 wherein said adjustable electronic program means includes:

coincidence gating means responsive to said program output signal and to said input means for enabling said program output signal upon coincidence with the next occurring input pulse; and said road measuring input means including monostable means for producing a pulse of predetermined duration as each of said input pulses thereby controlling the duration of pulses actually input to said adjustable program means.

3. The system as described in claim 1 wherein said adjustable electronic program means includes:

a counter for providing a sequence of interstage outputs representing an accumulated count of said input pulses; and manually adjustable switches connected to said interstage counter outputs for programming said desired interval of traversed distance along the road surface by selecting counter interstage outputs indicative of a counter contents corresponding to a desired selected programmed number of input pulses representing the desired interval of traversed distance along the road surface.

4. The system as described in claim 3 wherein: AND gate means having inputs thereof connected and controlled in accordance with the operative condition of said switches.

5. The apparatus as described in claim 3 further including:
reset means responsive to an output of said counter for producing a reset pulse upon the occurrence of said program output signal for resetting said counter in readiness for measuring the next selected interval of traversed distance.

6. The apparatus as described in claim 1 further including:
display means for producing an indication of the occurrence of said program output signal.

7. The apparatus as described in claim 6 wherein said display means includes:
audio oscillator means for producing an audio tone in response to said program output signal.

8. The system as described in claim 1 further including:
monostable flip-flop means for producing a control output in response to the program output signal, said control output having a relatively long duration as compared with the duration of said input pulses.

9. The system as described in claim 1 wherein:
said last-mentioned means comprises marker means for producing a mark directly onto the road surface for each program output signal.

10. The system as described in claim 9 wherein said last-mentioned means comprises:
a paint sprayer adapted to spray paint directly onto the road surface including a solenoid valve for controlling the spray thereof, said solenoid being operated in response to said program output signal for marking the road surface during the traverse thereof by the vehicle.

11. The system as described in claim 10 further including:
monstable means for producing a control output in response to the program output signal, said control output having a predetermined duration, and wherein
said solenoid is operated in response to said control output whereby the mark length of said road surface is controlled.

12. A system as in claim 1 further including a manually operable reset switch operatively connected to cause said adjustable electronic program means to begin a new period of counting said input pulses whereby the system may be manually adjusted to begin the desired cyclic marking process at any desired selected starting point along the road surface.

13. A system as in claim 1 further including a manually operable hold switch for inhibiting the cyclic marking process when desired thus preventing unnecessary undesired marking of the road surface.

14. A system as in claim 13 wherein said monostable means includes adjustment means for controllably adjusting said predetermined duration to a desired value whereby said mark length on the road surface is adjustably controlled to a corresponding desired value.

15. A system for periodically recording events as a function of distance traversed from a selected starting point comprising:
input means for generating a plurality of input pulses, each pulse indicating the traverse of a selected unit distance;
programmable means for periodically producing a program output upon the occurrence of a selected programmable number of said pulses thereby being indicative of a desired interval of traversed distance;
said programmable means including
a counter for providing a sequence of interstage outputs representing an accumulated count of said input pulses; and
a means for programming said desired interval of traversed distance including switch means for selecting counter interstage outputs indicative of a counter contents corresponding to the selected programmed number of input pulses representing the desired interval of traversed distance,
reset means responsive to an output of said counter for producing a reset pulse upon the occurrence of said selected output for resetting said counter in readiness for measuring the next selected interval of traversed distance,
said reset means including a bi-stable means having one stable state governed by said input means for producing an output indication that said input is present and its other stable state governed by said program output signal thereby producing said reset pulse to reset said counter, and
means responsive to the output of said programmable means for recording the occurrence of said output.

16. The apparatus as described in claim 15 further including:
a display means responsive to outputs of said bistable means for producing a display indicative of ongoing counting and reset operations.

17. A method for automatically and cyclically marking the surface of a road from a vehicle traveling therealong, said method comprising the steps of:
measuring predetermined increments of distance traversed by the vehicle over the road surface,
propelling the vehicle over the road surface,
producing an input pulse for each such increment of traversed distance.
automatically cyclically counting a desired adjustable number of said input pulses,
automatically and cyclically producing a program output signal every time said adjustable number of pulses have been counted,
adjusting the value of said adjustable number to correspond to a desired distance interval between the start of successive marks to be applied to the road surface,
marking the road surface in response to said program output signal whereby marks are automatically and cyclically applied directly to the road surface at said desired distance intervals.

18. A method as in claim 17 including the step of optionally inhibiting the marking of the road surface to prevent unnecessary undesired marking thereof.

19. A method as in claim 17 including the step of manually restarting said cyclically counting step at a desired reference location whereby the cyclic marking process is controlled to begin at said reference location along the road.

20. A method as in claim 17 including the step of adjustably controlling the duration of the marking step to a desired predetermined value whereby the mark length on the road surface is adjustably controlled to a corresponding desired value.

* * * * *